June 2, 1959  G. O. CONNER  2,888,852
NON-RESILIENTLY DEFORMABLE LOCKING RING
Filed July 1, 1955
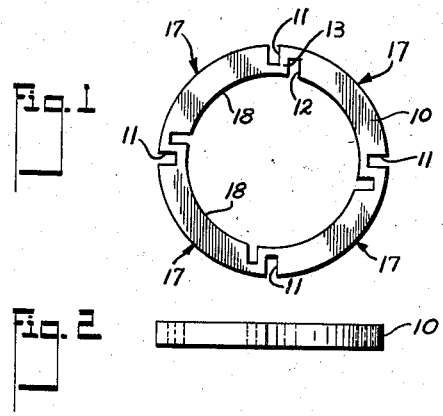
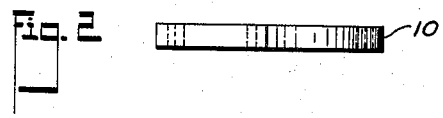
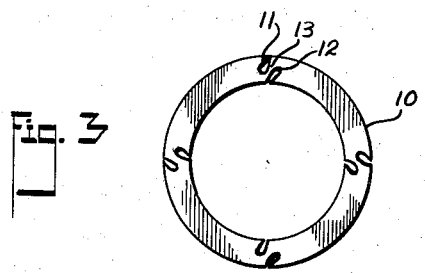
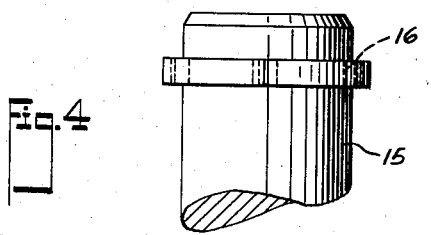
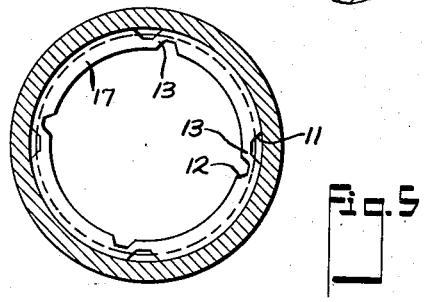
INVENTOR.
GUY O. CONNER
BY
J. O. Douglas
HIS ATTORNEY United States Patent Office 2,888,852
Patented June 2, 1959

2,888,852

NON-RESILIENTLY DEFORMABLE LOCKING RING

Guy O. Conner, Cleveland Heights, Ohio

Application July 1, 1955, Serial No. 519,427

1 Claim. (Cl. 85—8.6)

This invention relates to self-locking devices and more particularly to a locking ring. It will be appreciated however that the invention is not limited to locking rings specifically but could be used for other purposes such as bearings.

It is customary when an article is to be held upon a cylindrical shaft or in a bore to provide a circular groove in the shaft or bore which is disposed closely adjacent to the article that is to be held, and a so-called locking or C-ring, which is made of resilient material, is forced over the shaft or into the bore and springs into the groove to hold the article in place. The prior C-rings were normally made of a resilient material, and even when so constructed, are frequently distorted so that they are loose and have a tendency to release their engagement with the groove. In addition thereto these rings are difficult to install especially in the larger sizes, having tendencies to scrape the metal and cause burrs upon the shaft and frequently requiring the need of special tools for their insertion or removal.

By the present invention I have provided a locking ring which initially is of such a size that it slips readily over the shaft or into a bore without binding thereon until it is opposite to the groove after which pressure upon the center or inner periphery of the ring enables it to be distorted and forced home into the groove in a tight and substantially permanent manner. The ring can however be removed should occasion require its removal.

In the drawings:

Fig. 1 is a plan view of the locking ring of my invention;

Fig. 2 is an elevational view thereof;

Fig. 3 is a view showing the formation of the ring as it appears after distortion;

Fig. 4 shows the ring in position on a shaft; and

Fig. 5 shows the ring in position in a groove of a bore.

Briefly the invention comprises providing a ring or tubular body with longitudinally extending slots in the outer periphery extending toward the inner periphery and closely adjacent slots in the inner periphery extending toward the outer periphery, the distance between the two slots being such that the metal between the slots may be distorted to enable the circumference of the ring to be decreased or increased.

As better shown in Figs. 1 and 2 the ring is a body 10, normally having a greater width than its thickness. A plurality of diametrically opposed notches 11 are provided extending from the outer periphery inwardly toward the inner periphery but terminating short thereof. Closely adjacent to the outer notches and extending from the inner periphery toward the outer periphery are additional notches 12. It will be noted that the notches 11 and 12 overlap each other to provide a relatively narrow strip of metal 13 therebetween. Preferably the material forming the ring should be distortable soft metal.

In operation a shaft 15, upon which some device is to be secured is provided with a groove 16 of a width equal to or slightly greater than the thickness of the ring. The ring is slipped over the shaft opposite to the groove and pressure is exerted on the periphery at the points indicated by the arrows 17 to force the portions of the ring between the pairs of notches 11 and 12 inwardly into the groove. When this is done the material between the notches distorts to substantially the shape shown in Fig. 3. It will be appreciated that the showing in Fig. 3 is by way of illustration since the distortion of material and the notches and the ultimate form taken thereby will depend largely upon the character of the metal being used for the ring. The result is that the ring decreases in diameter which enables it to seat in the groove.

The arcuate surfaces 18 on the inner periphery of the ring can be a circle or may have a radius substantially equal to the curvature of the bottom of the groove. It will be appreciated however that it is not necessarily essential that the inner periphery completely seat in the bottom of the groove.

Although I have described the ring as being made of metal it will be apparent that certain types of plastic may be used and be very effective.

By way of illustration I have disclosed the invention as being applied to a ring where the thickness of the ring is less than its width. It will be apparent that the width could be less than the thickness in which event the ring would be considered as a tube rather than a ring. The slots, particularly when they are applied to a tube, may run perpendicular to the ends of the tube or extend in a helical fashion longitudinally of the tube.

The invention is also useful in the provision of bearings or bushings for shafts particularly where bearings may be of different metal than the shaft since this would enable a bearing made of softer metal to be disposed in a groove on a shaft and distorted into position in a relatively easy manner.

As shown in Fig. 5, the ring has been distorted to expand it into a groove interiorly of a bore. In this the notches widen out instead of close up. In either instance the ring may be easily removed by insertion of a tool or hook into the opening that is defined by the portion of the notch extending beyond the groove and pressing the material outwardly to cause it to assume a wider opening in the case of a shaft, or a narrow opening, in the case of a bore.

Having thus described my invention I am aware that numerous and extensive departures may be made therefrom without departing from the spirit or scope of the invention as defined in the appended claim.

I claim:

A locking ring in the form of a continuous member having a radially inner periphery and a radially outer periphery and composed of permanently deformable, substantially non-resilient material, the outside diameter of said ring being substantially greater than the axial thickness of the ring, said ring having a plurality of first slots which are open at the radially outer periphery of the ring and which extend inward therefrom toward the radially inner periphery of the ring and terminate in closed inner ends short of the radially inner periphery of the ring, said ring having a plurality of second slots therein which are open at the radially inner periphery of the ring and which extend outward therefrom beyond the inner ends of the first slots toward the radially outer periphery of the ring and terminate in closed ends short of the radially outer periphery of the ring, each second slot being positioned in close proximity to a corresponding first slot so as to form therewith a pair of oppositely directed slots separated from each other by a thin, readily deformable connecting segment of the ring disposed between the respective closed inner ends of said pair of slots, each of said pairs of slots being spaced from the next pair of slots around the ring a substantially greater distance than the spacing between the respective first and second slots forming each pair, and each pair of slots being separated from the next pair of slots around the ring by an elongated segment of the ring which is less readily deformable than said thin segment between the respective first and second slots of each pair.

References Cited in the file of this patent

UNITED STATES PATENTS

| | | |
|---|---|---|
| 345,767 | Buckley | July 20, 1886 |
| 1,092,256 | Glauber | Apr. 7, 1914 |
| 2,573,498 | Scott | Oct. 30, 1951 |
| 2,798,748 | Maurer | July 9, 1957 |

FOREIGN PATENTS

| | | |
|---|---|---|
| 864,376 | France | Jan. 17, 1941 |
| 1,071,376 | France | Mar. 3, 1954 |